United States Patent [19]

Strauts et al.

[11] 3,866,116
[45] Feb. 11, 1975

[54] EDDY CURRENT TESTING SYSTEM HAVING PROBE SWITCHING AND GATING MEANS

[75] Inventors: Eric J. Strauts, Harwood Heights; John J. Flaherty, Elk Grove; Donald E. Lorenzi, Des Plaines, all of Ill.

[73] Assignee: Magnaflux Corporation, Chicago, Ill.

[22] Filed: Apr. 23, 1973

[21] Appl. No.: 353,332

[52] U.S. Cl. .................................................. 324/40
[51] Int. Cl. .............................................. G01r 33/12
[58] Field of Search .............................. 324/37, 40

[56] References Cited
UNITED STATES PATENTS

| | | | |
|---|---|---|---|
| 2,770,773 | 11/1956 | Cooley | 324/37 |
| 3,247,453 | 4/1966 | Quittner | 324/37 |
| 3,315,155 | 4/1967 | Colani | 324/40 |
| 3,526,829 | 9/1970 | Noble | 324/40 |
| 3,675,118 | 7/1972 | Booth | 324/37 |

FOREIGN PATENTS OR APPLICATIONS
950,696    2/1964    Great Britain .................... 324/37

*Primary Examiner*—Robert J. Corcoran
*Attorney, Agent, or Firm*—Van Metre Lund

[57]         ABSTRACT

Non-destructive testing system in which a plurality of eddy current probes are disposed against spaced portions of a part and are coupled through input and output groups of gate means to an energizing current source and to an output circuit. The gate means are controlled from a sequencing circuit including flip-flops responsive to a clock signal and gates for combining outputs from the flip-flops to develop first and second series of sequential control signals for operation of the input and output gate means in a manner such as to avoid interaction between probes. Each of the second series of control signals preferably has a duration less than that of the corresponding one of the first series, starting after and ending before.

9 Claims, 8 Drawing Figures

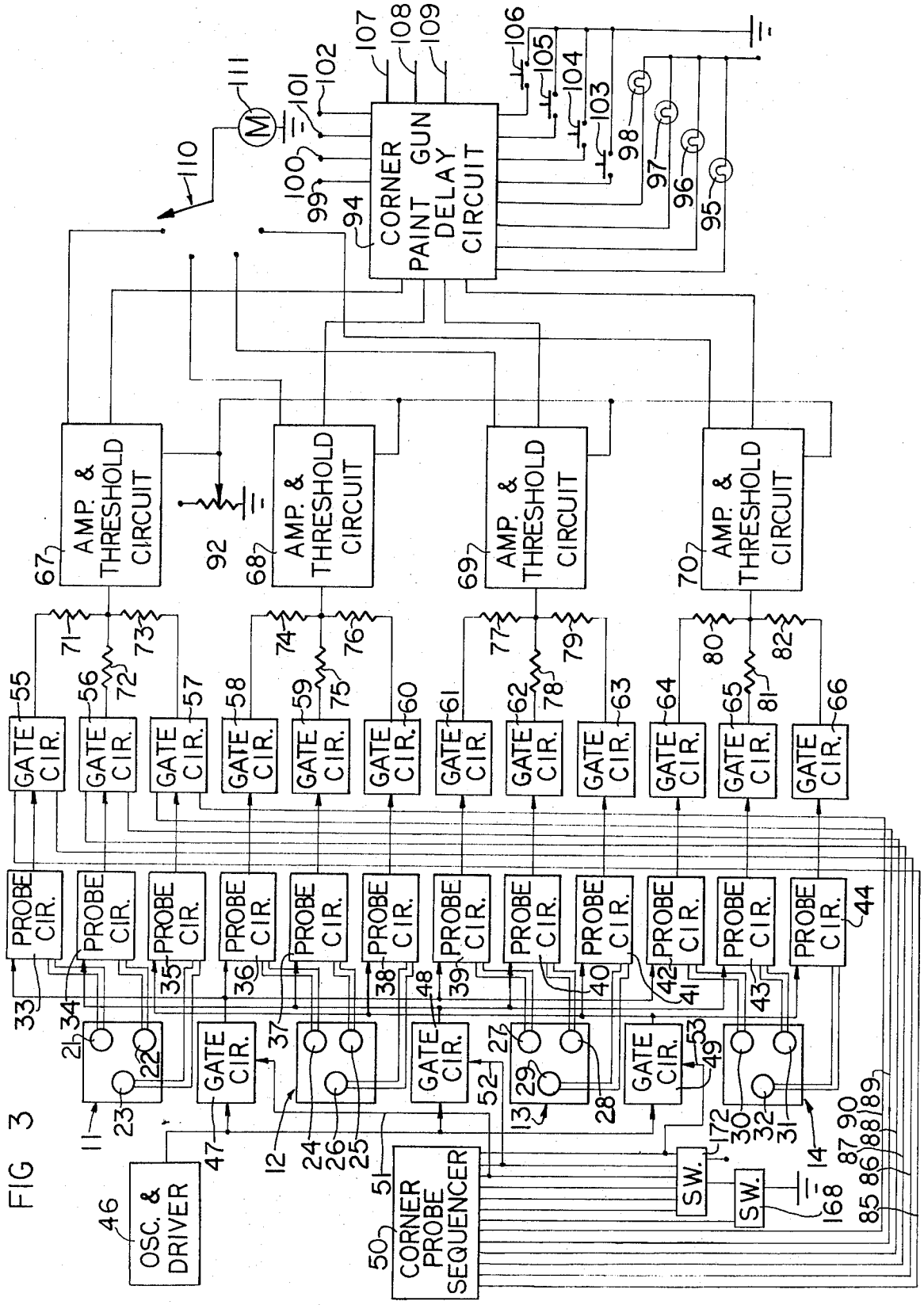

EDDY CURRENT TESTING SYSTEM HAVING PROBE SWITCHING AND GATING MEANS

This invention relates to a multi-probe non-destructive testing system and more particularly to a system in which interaction between probes is obviated in a highly reliable manner, permitting placement of probes in close proximity.

Various types of non-destructive testing systems have heretofore been proposed wherein a plurality of probes are supported in spaced relation for disposition against spaced portions of a part. For example, systems have been proposed wherein eddy current probes are disposed against a surface of a billet or other part being inspected for simultaneous testing of the different portions of the billet. Difficulties have been experiences, however, due to inductive coupling between adjacent probes causing them to unbalance one another, especially when excited from a common oscillator, or causing the development of heterodyne beats, when excited from separate oscillators. Shielding of the probes has not been effective to avoid such highly undesirable effects, especially when the probes are relatively close together.

This invention was evolved with the general object of overcoming the disadvantages of prior art systems and of providing a system in which the effect of interaction between adjacent probes is obviated.

In accordance with this invention, a plurality of probes such as, for example, eddy current probes, are disposed against spaced portions of a part such as a steel billet, and are coupled through first and second coupling means to an energizing current source and to an output circuit, at least one of the coupling means including gate means controlled from a sequencing circuit to be operated sequentially. With this arrangement, the probe means cannot operate simultaneously to supply output signals to the output circuit, and the effect of interaction between the probe means such as caused, for example, by inductive coupling between eddy current probes, is obviated. An additional advantage is that it is not necesssary to provide shielding means such as proposed in the prior art.

Preferably, and in accordance with a specific feature of the invention, two groups of gate means are provided, one group being used to couple the probe means to the energizing current source and the other being used to couple the probe means to the output circuit.

Additional important features relate to the construction of a sequencing circuit in which flip-flop means are triggered from a clock signal source and gates are controlled from the flip-flop means to develop first and second series of control signals for control of the input and output gate means.

Another important feature relates to the operation of the output gate means at times starting substantially after the start of operation of the input gate means and ending at times not later than and preferably before the end of the operation of the input gate means. With this specific feature, the operation of the probe means is stabilized at the times of operation of the output gates and undesirable effects of transient signal conditions are obviated. Additional features relate to the use of common amplifier and threshhold circuits for the probe means and to an arrangement of probes and applications of signals to gate means therefor to permit simultaneous testing of separate portions of each of four corner parts of a billet.

This invention contemplates other objects, features and advantages which will become more fully apparent from the following detailed description taken in conjunction with the accompanying drawings which illustrate a preferred embodiment and in which:

FIG. 3 is a block diagram of a system for energizing the probes of the probe assemblies and for applying output signals therefrom to an output circuit, in accordance with the invention;

Figure 2:
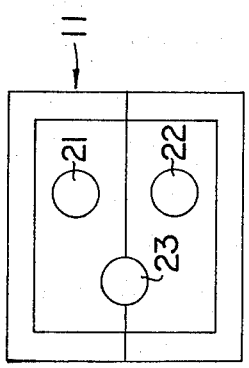
FIG. 2 is a view taken substantially along line II—II of FIG. 1, illustrating the face of one probe assembly and the disposition and orientation of probes thereof.
Figure 1:
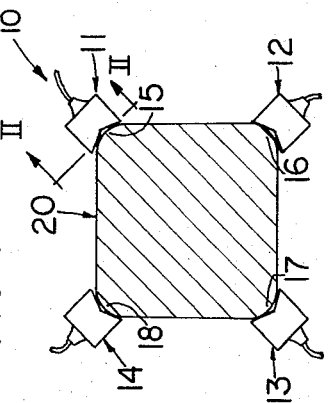
FIG. 1 illustrates four multi-probe assemblies disposed against four corner portions of a billet.

Reference numeral 10 generally designates a probe arrangement wherein four corner probe assemblies 11-14 are disposed against four corner portions 15-18 of a generally square billet 20. As shown in FIG. 2, the probe assembly 11 comprises three probe units 21, 22 and 23. Probe units 21 and 22 have axes at approximately a 45° angle to eachother and each at approximately a 22½° angle to a central plane of the unit extending through the central axis of the billet 20. The axis of the unit 23 is aligned with the central plane of the unit. With longitudinal movement of the billet 20, probe units 21 and 22 scan portions of the billet spaced from the apex of the corner portion 15 while the probe unit 23 scans along the apex of the corner portion 15. Thus substantially the entire corner portion 15 of the billet 20 is scanned.

The corner probe assemblies 12, 13 and 14 are of similar construction and as diagrammatically shown in FIG. 3, assembly 12 comprises three probe units 24, 25 and 26, assembly 13 comprises three probe units 27, 28 and 29 and assembly 14 comprises three probe units 30, 31 and 32.

The probe units 21-22 are preferably eddy current probes and are coupled to probe circuits 33-44 each of which is arranged for coupling a high frequency energizing current to the probe unit and each of which is arranged for processing signals from the associated probe unit to develop an output signal corresponding to inhomogeneities in the portion of the billet scanned by the probe unit. The details of construction of eddy current probes and of processing circuitry suitable for the purpose are known in the art and are therefore not illustrated.

To supply energizing current for coils of the probe units 21-32, an oscillator and probe driver circuit 46 is provided which may supply current at a frequency of 100 KHz, by way of example. Three gate circuits 47, 48 and 49 are provided having inputs coupled to the oscillator and driver circuit 46. The output of gate circuit 47 is coupled to probe circuits 33, 36, 39 and 42; the output of gate circuit 48 is coupled to probe circuits 34, 37, 40 and 43; and the output of gate circuit 49 is coupled to probe circuits 35, 38, 41 and 44. A corner probe sequencer circuit 50 applies signals sequentially to the gate circuits 47–49 through lines 51–53.

In operation, when a signal is applied to line 51, energizing current from circuit 46 is applied through the gate circuit 47 and through the probe circuits 33, 36, 39 and 42 to the probes 21, 24, 27 and 30. Thereafter, a signal is applied to line 52 and energizing current is applied through gate 48 and probe circuits 34, 37, 40 and 43 to probe units 22, 25, 28 and 31. Thereafter, a signal is applied to line 53 and energizing current is applied through gate circuit 49 and probe circuits 35, 38, 41 and 44 to the probe units 23, 26, 29 and 32. It is noted that when energizing current is applied to any one probe unit of any one corner probe assembly, the other two probe units of that assembly are deenergized. Thus no two probe units of the same probe assembly are simultaneously energized and interaction effects between closely adjacent probe units, which might otherwise result, are obviated.

The outputs of the probe circuits 33–44 are applied to inputs of 12 gate circuits 55–66 having outputs applied to inputs of four amplifier and threshhold circuits 67–70, the outputs of gate circuits 55–57 being applied through resistors 71–73 to the input of circuit 67, the outputs of gate circuits 58–60 being applied through resistors 74–76 to the input of circuit 68, the outputs of gate circuits 61–63 being applied through resistors 77–79 to the input of circuit 69 and the outputs of gate circuits 64–66 being applied through resistors 80–82 to the input of circuit 70. Gate circuits 55–66 are controlled by signals from the corner probe sequencing circuit 50, applied through lines 85–90. Lines 85 and 86 are connected to gate circuits 55, 58, 61 and 64; lines 87 and 88 to gate circuits 56, 59, 62 and 65; and lines 89 and 90 to gate circuits 57, 60, 63 and 66.

In operation, during the time that a signal is applied through line 51 to the gate circuit 47, a pair of "high" and "low" gating signals are simultaneously applied through lines 85 and 86 to cause the gate circuits 55, 58, 61 and 64 to be operative to apply any output signals developed by probe circuits 33, 36, 39 and 42 to amplifier and threshhold circuits 67–70. Similarly, during the time that a signal is applied through line 52 to the gate circuit 48, a pair of gating signals are applied through lines 87 and 88 to gate circuits 56, 59, 62 and 65 and during the time a signal is applied through line 53 to gate circuit 49, a pair of gating signals are applied through lines 89 and 90 to gate circuits 57, 60, 63 and 66.

In accordance with an important feature of the invention, the pairs of gating signals applied on lines 85–90 have durations less than those applied on lines 51–52, each pair starting after and preferably ending before the signal applied through the corresponding one of the lines 51–53. With this feature, the effect of transients is avoided, the operation of the probe units and probe circuits being stabilized during operation of the output gate circuits 55–66.

Output of any one of the amplifier and threshhold circuits 67–70 exceeds a certain amplitude, determined by the position of adjustment of a potentiometer 92 connected to the circuits 67–70, a signal is applied to an output circuit in the form of a corner paint gun delay circuit 94. Circuit 94 applies a corresponding signal to one of four indicator lights 95–98 and also applies a delayed output signal to a corresponding one of four output terminals 99–102 for connection to spray guns arranged for marking the corner portions 15–18 of the billet 20 at points along the length thereof aligned with the defect which produced the output signal, the delay time being proportioned according to the speed of movement of the billet and the spacing between the spray guns and the probe assemblies 11–14.

The details of the corner paint gun delay circuit 94 are not essential to an understanding of the invention and they are therefore not illustrated. It is noted, however, that the circuit may be connected to four push-button switches 103–106 which may be operated for testing the operation of paint guns connected to the output terminals 99–102. Also, a clock signal may be applied through a line 107 and additional control and test signals may be applied through lines 108 and 109.

For adustment of the balance of the outputs of the amplifier and threshhold circuits 67–70 they are connectable through a selector switch 110 to a meter 111.

Figure 4:
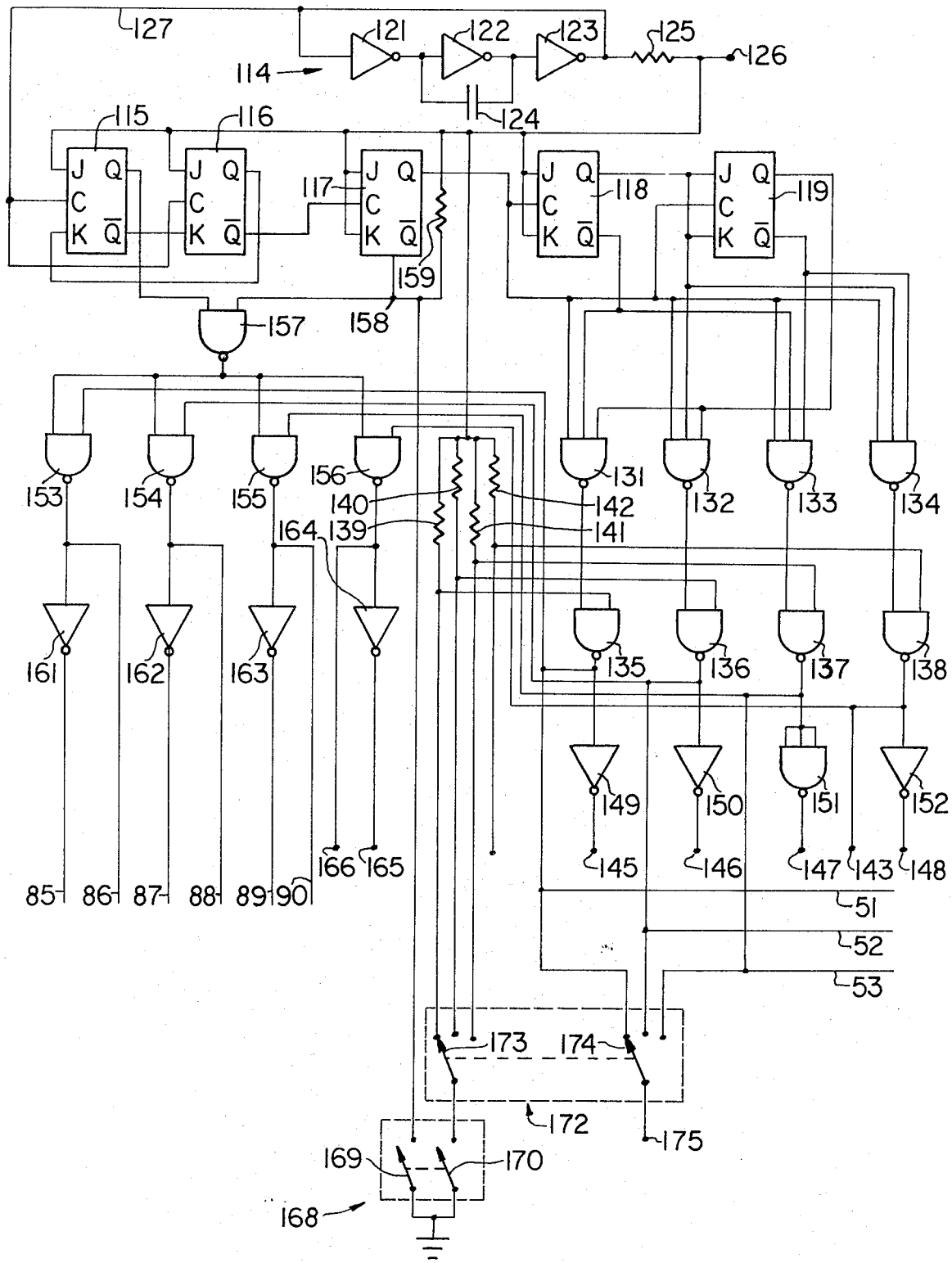
FIG. 4 is a circuit diagram of a corner probe sequencer circuit.

FIG. 4 is a diagram of the corner probe sequencing circuit 50 which includes an oscillator 114 operative to generate a square wave clock signal, five J-K flip-flops 115–119 operative to generate signals at frequencies equal to sub-multiples of the clock signal frequency and a plurality of gate circuits for combining outputs of the flip-flops 115–119 in a manner such as to develop the sequencing signals on lines 51–53 and 85–90. In addition, the circuit 50 includes circuitry controllable by manually operable switches for permitting selective operation of the probe units, for balancing and checking of the operation of the circuits as required.

The oscillator 114 comprises three inverters 121–123, the output of inverter 121 being connected to the input of inverter 122 and to one terminal of a capacitor 124, the output of inverter 122 being connected to the other terminal of capacitor 124 and to the input of inverter 123 and the output of inverter 123 being connected through a resistor 125 to a power supply terminal 126 and being also connected to the input of inverter 121 and to an output line 127. With this arrangement, a square wave signal is developed on line 127 having a frequency dependent upon the value of capacitor 124. This signal is applied to clock inputs of flip-flops 115 and 116 the J inputs of which are connected to power supply terminal 126. The $\bar{Q}$ output of flip-flop 115 is connected to the K input of flip-flop 116 while the Q output of flip-flop 116 is connected to the K input of flip-flop 115.

Figure 5:
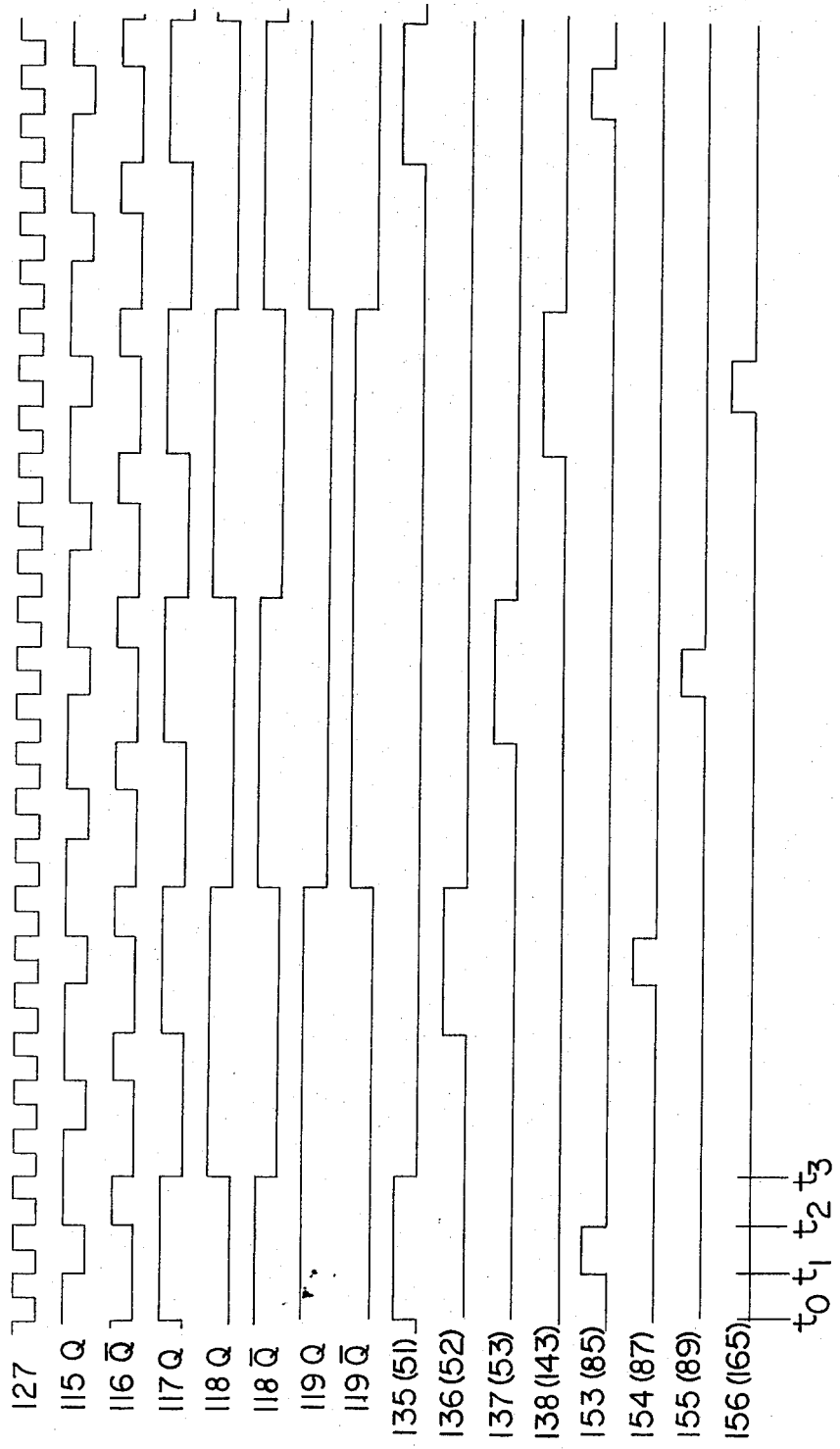
FIG. 5 illustrates wave forms for explanation of the operation of the corner probe sequencer circuit of FIG. 4.

Referring to FIG. 5, the first three wave forms are those on the oscillator output line 127, the Q output of flip-flop 115 and the $\bar{Q}$ output of the flip-flop 116. It is noted that each of the flip-flop outputs is at a frequency of one-third the frequency of the oscillator output and that the flip-flop outputs are in phase displaced relation.

The $\bar{Q}$ output of the flip-flop 116 is applied to the clock input of flip-flop 117, the J and K inputs of which are connected to the power supply terminal 126 and the Q output of which is applied to the clock inputs of flip-flops 118 and 119. The J and K inputs of flip-flop 118 are connected to terminal 126 while the J and K inputs of flip-flop 119 are connected to the Q output of flip-flop 118. With such connections, the flip-flops 117, 118 and 119 each operate to provide a divide-by-two function, the wave forms at the outputs thereof being shown in FIG. 5.

A set of four NAND gates 131–134 are provided having inputs connected to outputs of the flip-flops 117,

118 and 119 in the manner as illustrated and having outputs connected to inputs of a second set of four NAND gates 135–138. Additional inputs of gates 135–138 are connected through the resistors 139–142 to the power supply terminal 126 and, as hereinafter described may be selectively grounded for operation of only one probe, such second inputs being normally ungrounded during automatic operation. The outputs of gates 135, 136 and 137 are connected to the lines 51, 52 and 53 respectively while the output of gate 138 is connected to a terminal 143 which is not used in the illustrated system but may be used when, for example, probe assemblies are provided having four probe units rather than three probe units as in the illustrated arrangement. It is also noted that the outputs of gates 135–138 are applied to output terminals 145–148 through inverters 149 and 150, a NAND gate 151 operative as an inverter and inverter 152. Output terminals 145–148 are not used in the system as illustrated but are provided to permit use of input probe gates of forms different from the illustrated gate circuits 47–49.

With the connections of the gates 131–138 as illustrated and with the second inputs of gates 135–138 being ungrounded, wave forms are developed at the outputs of gates 135–138 as shown in FIG. 5. It is noted that the signals are developed at the outputs of gates 135–138 sequentially with time spacings between the end of one signal and the start of the next. Thus, the signal at the output of gate 135 is on for three full cycles of the input clock signal applied on line 127. During the next three full cycles, no output signal is developed from any of the gate circuits 135–138. Then the gate 136 develops an output signal for three cycles, and so on. The time spacings between the signals is highly desirable in preventing any interaction between the probe units of each probe assembly.

The outputs of gates 135–138 are connected to inputs of another set of four NAND gates 153–156 having second inputs connected together and to the output of a NAND gate 157. One input of gate 157 is connected to the Q output of flip-flop 115 while a second input is connected to a circuit point 158 which is connected through a resistor 159 to the power supply terminal 126. Circuit point 158 is also connected to a power supply input of the flip-flop 117. As hereinafter described, circuit point 158 may be grounded for selective operation of the probes but is normally ungrounded for automatic operation, permitting operation of the gate 157 in response to signals from the Q output of flip-flop 115 and also permitting operation of the flip flop 117.

The outputs of flip-flops 153–156 are connected to inputs of inverters 161–164. Lines 85, 87 and 89 are connected to the outputs of inverters 161, 162 and 163 while lines 86, 88 and 90 are connected to outputs of the gates 153, 154 and 155. A terminal 165 and a terminal 166 are connected to outputs of the inverter 164 and gate 156 and are not used in the illustrated system but may be used if, for example, an additional probe unit were added to each probe assembly.

With the illustrated arrangement, signals are developed on the lines 85, 87, 89 and on terminal 165 having wave forms as illustrated in FIG. 5, it being understood that signals of opposite form are developed on the lines 86, 88 and 90 and terminal 166.

With reference to FIG. 5, it will be noted that the signal at the output of gate 135, applied to one input of gate 153, is high from a time $t_0$ to a time $t_3$, after three cycles of the input clock signal on line 127. The signal at the Q output of the flip-flop 115 is low from time $t_1$ to time $t_2$ and hence the signal at the output of gate 157, applied to one input of gate 153, is high from time $t_1$ to time $t_2$. Since both inputs of gate 153 are high from time $t_1$ to time $t_2$, the output thereof will be low and the output of the inverter 161, connected to line 85, is high. Thus, during three cycles of the input square wave on line 127, a high signal is developed on line 51 while a high signal is developed on the line 85 only during the second of such three cycles. Similarly, high signals are developed on lines 87 and 89 only during the middle part of the corresponding high signals developed on lines 52 and 53. Each signal on each of the lines 85, 87 and 89 starts after and terminates before the signal on the corresponding one of the lines 51, 52 or 53.

This feature is very important in that at the time of effective opening of each of the output gate circuits 55–66, the operation of the probes and probe circuits is stabilized and the energizing signal to the probe circuits, applied through one of the input gate circuits 47–49, is not switched off until after the time of effective closing of the output gate circuit. Thus, the output signals are not affected by any transient signals developed from opening or closing of the input gate circuits 47–49.

For balancing and checking of the operation of the circuits, means are provided for selectively operating groups of the probe circuits 33–44 and corresponding gate circuits 55–66, without the automatic sequencing operation, and also for permitting selective triggering of an oscilloscope during automatic operation. In particular, an automatic-manual switch 168 is provided having two ganged contacts 169 and 170 and a probe select switch 172 is provided having ganged contacts 173 and 714, contact 173 being selectively connectable with inputs of gates 135, 136 and 137 while contact 174 is selectively connectable to lines 51, 52 and 53, contact 174 being connected to a terminal 175 for connection to a triggering input of an oscilloscope. In automatic operation, the contact 174 permits triggering of an oscilloscope selectively from the signals developed on lines 51, 52 and 53, but contact 174 has no function in the manual operation.

In manual operation, contact 169 grounds circuit point 158 so that the output of gate 157 is maintained high and also the flip-flop 117 is placed in a reset condition, the Q output thereof being low, and the outputs of all of the gates 131–134 being maintained high. Contact 170 grounds the selector switch contact 173 and, for example, when contact 173 is connected to the input of gate 135, as illustrated, the output of gate 135 is high while the outputs of gates 136–138 are low. With the output of gate 135 being high, both inputs to the gate 153 will be high and the output thereof will be low, producing a high output on line 85. At the same time, low inputs are applied to gates 154, 155 and 156 from the gates 136, 137 and 138 so that the outputs thereof will be high. Accordingly, with reference to FIG. 3, only the gate circuit 47 will be operative to apply energizing signals only to the probe circuits 33, 36, 39 and 42 and associated probe units and only the output gate circuits 55, 58, 61 and 64 will be operative. Then, by operation of the selector switch 110, individual probes and probe circuits can be balanced or such other operations can be performed as desired to insure proper operation of the system.

Figure 6:
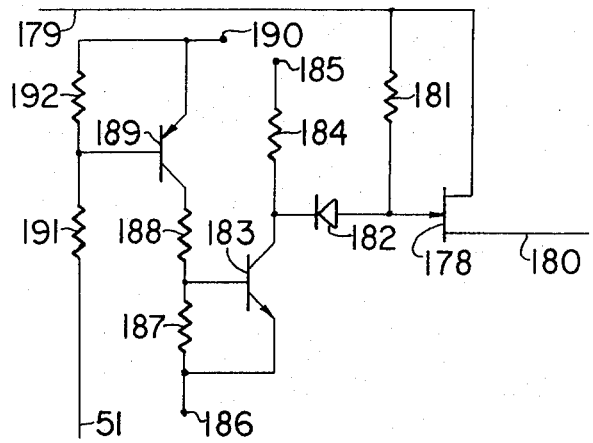
FIG. 6 is a circuit diagram of an input gate circuit.

FIG. 6 is a circuit diagram of the input gate circuit 47, the other input gate circuits 48 and 49 being the same. A unijunction transistor 178 is provided having bases connected to input and output lines 179 and 180, input line 179 being connected to the oscillator and driver circuit 46 while output line 180 is connected to the probe circuits 33, 36, 39 and 42. The emitter of transistor 178 is connected through a resistor 181 to the input line 179 and through a diode 182 to the collector of a transistor 183, connected through a resistor 184 to a power supply terminal 185 which may, for example, be at plus 12 volts relative to ground. The emitter of transistor 183 is connected to another power supply terminal 186 which may, for example, be at minus 12 volts relative to ground. The base of transistor 183 is connected through a resistor 187 to the terminal 186 and through a resistor 188 to the collector of a transistor 189 the emitter of which is connected to a power supply terminal 190 which may, for example be at plus 5 volts relative to ground. The base of transistor 189 is connected through a resistor 191 to the line 51 and through a resistor 192 to the power supply terminal 190. In operation, the line 51 is normally at approximately ground potential, causing conduction of the transistor 189 which in turn causes conduction of the transistor 183, driving the collector thereof to a relatively low potential and, through the diode 182, preventing conduction of the transistor 178. When a high signal is applied on line 51 (from time $t_0$ to time $t_3$, FIG. 5), the transistor 189 is cut off, cutting off transistor 183 so that the collector thereof is placed at a high potential, allowing the transistor 178 to conduct to apply an energizing signal from the oscillator 46 to the probe circuits 33, 36, 39 and 42.

Figure 7:
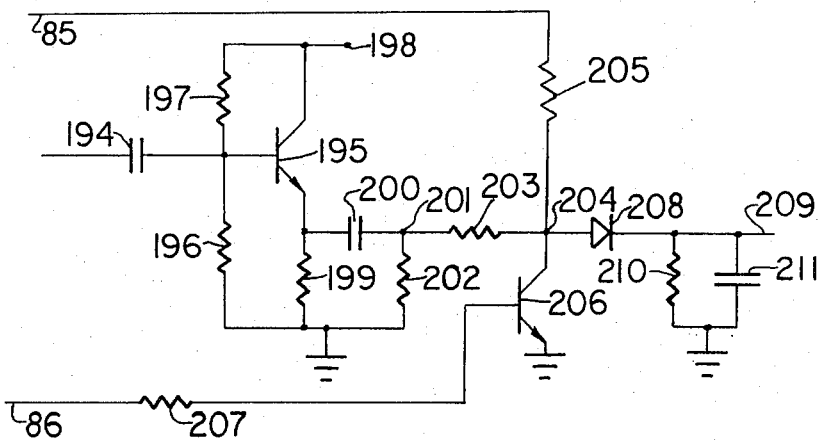
FIG. 7 is a circuit diagram of an output gate circuit.

FIG. 7 is a circuit diagram of the output gate circuit 55, the other output gate circuits 56–66 being the same. The output from the probe circuit 33 is applied through a capacitor 194 to the base of a transistor 195, connected through a resistor 196 to ground and through a resistor 197 to a power supply terminal 198 which may be at plus 12 volts with respect to ground. The collector of the transistor 195 is connected to terminal 198 while the emitter is connected through a resistor 199 to ground and through a coupling capacitor 200 to a circuit point 201 which is connected through a resistor 202 to ground and through a resistor 203 to a circuit point 204. Circuit point 204 is connected through a resistor 205 to line 85 and also to the collector of a transistor 206 having a grounded emitter and having a base connected through a resistor 207 to the line 86. Circuit point 204 is additionally connected through a diode 208 to an output line 209 which is connected through a resistor 210 and a parallel capacitor 211 to ground.

In operation, the transistor 195 operates as an emitter-follower, applying any input signal through the coupling capacitor 200 to the circuit point 201. Normally, the line 85 is low, approximately at ground potential, while the line 86 is high at plus 5 volts relative to ground, for example. The transistor 206 conducts heavily, clamping the circuit point 204 to ground and preventing transmission of the signal from circuit point 201 through resistor 203 and diode 208 to the output line 209. When the signal at line 85 goes high and the signal at line 86 goes low, the transistor 206 is rendered non-conductive, and the potential of the circuit point 204 rises somewhat above ground potential, to allow feed of the signal from circuit point 201 through resistor 203 and diode 208 to the output line 209. When the line 85 again goes low, and the line 86 goes high, the transistor 206 is again rendered conductive to clamp the circuit point 204 to ground and to prevent transmission of signals through the diode 208 to the output line 209. With this circuit arrangement, the generation of transients at the beginning and end of the gating time interval is substantially obviated.

Figure 8:
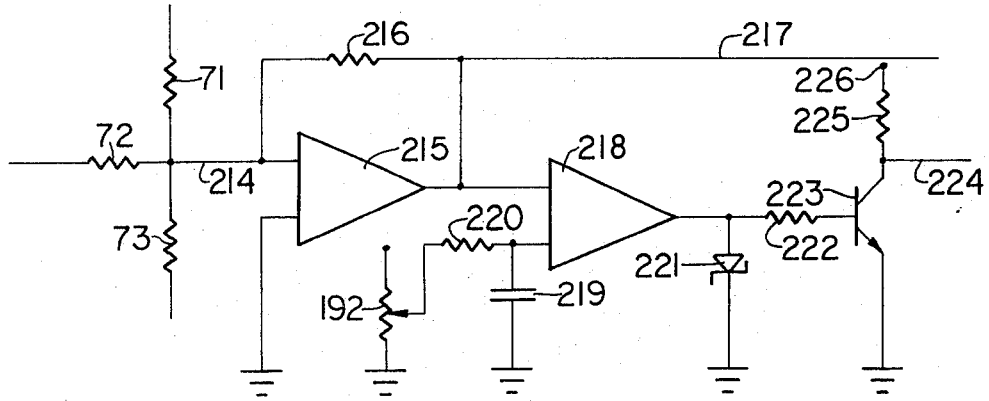
FIG. 8 is a circuit diagram of an amplifier and threshhold circuit.

FIG. 8 is a circuit diagram of the amplifier and threshhold circuit 67, the other amplifier and threshhold circuits 68, 69 and 70 being the same. An input line 214, connected through resistors 71, 72 and 73 to the outputs of the gate circuits 55–57, is connected to the minus input of the operational amplifier 215 having a grounded plus input and having an output connected through a resistor 216 to the input line 214, the output being also connected to a line 217 for connection through selector switch 110 to the meter 111 and to the minus input of a second operational amplifier 218. The plus input of amplifier 218 is connected through a capacitor 219 to ground and through a resistor 220 to the movable contact of the threshhold adjustment potentiometer 92. The output of amplifier 218 is connected through a Zener diode 221 to ground and through a resistor 222 to the base of a transistor 223 having a grounded emitter and having a collector connected to an output line 224 and also connected through a resistor 225 to a power supply terminal 226. Line 224 is connected to one input of the corner paint gun delay circuit 94.

In operation, the amplifier 215 amplifies the input signals and, when input signals exceed a threshhold value, determined by the position of adjustment of the potentiometer 92, amplified output signals are applied from the output of amplifier 218 to the transistor 223 to produce further amplified output signals on line 224.

It is noted that in the arrangement as illustrated, the gated probe outputs are added together, through the resistors 71, 72 and 73, and then amplified by amplifiers 215 and 218 and the transistor 223. Thus the number of amplifiers is minimized. However, if desired, the gated probe outputs could be amplified and then added together which is desirable when the signals are of very low level, in minimizing noise. It is further noted that because of the sequencing, the signals from the gate circuits 55–57, added through the resistors 71–73 do not overlap because of the sequencing, permitting use of the common threshhold arrangement.

It will be understood that modifications and variations may be effected without departing from the spirit and scope of the novel concepts of this invention.

We claim as our invention:

1. In a non-destructive testing system, a plurality of eddy current probe means supported in closely spaced relation for disposition against closely spaced portions of a part, each of said probe means being operative when supplied with an energizing signal to develop an output signal corresponding to characteristics of the portions of the part adjacent thereto, a source of a high frequency energizing voltage, first coupling means coupling said energizing voltage source to said plurality of probe means, an output circuit, second coupling means coupling said plurality of probe means to said output circuit, said first coupling means comprising a first plurality of gate means corresponding to said plurality of probe means for controlling application of said energizing voltage thereto, said second coupling means comprising a second plurality of gate means corresponding to said plurality of probe means for supplying output signals from said probe means to said output circuit, and sequencing means for operating said first and second pluralities of gate means sequentially and in synchronism with each of said second plurality of gate means being operated at a time starting substantially after the start of the operation of the corresponding one of said first plurality of gate means and ending at a time not later than the end of the operation of the corresponding one of said first plurality of gate means.

2. In a system as defined in claim 1, said sequencing means including means for developing a first series of control signals in sequence and a second series of control signal corresponding to and in synchronized relation to said first series of control signals, means for applying said first series of control signals to said first plurality of gate means, and means for applying said second series of control signals to said second plurality of gate means.

3. In a system as defined in claim 2, each of said first series of control signals having an ending time substantially before the starting time of the next subsequent one of said first series of control signals.

4. In a system as defined in claim 2, said sequencing means comprising a clock signal source, flip-flop means triggered from said clock signal source, and gates controlled from said flip-flop means to develop said first and second series of control signals.

5. In a system as defined in claim 4, said flip-flop means comprising a pair of flip-flops triggered from said clock signal source to develop a signal at one-third the frequency of the clock signal and having one value during one cycle of the clock signal and a different value during the next following two cycles of the clock signal, and additional flip-flops arranged for developing signals at sub-multiples of the clock signal frequency, said gates including gates connected to outputs of said additional flip-flops for developing said first series of control signals with each of said first series of control signals having a duration of three cycles of the clock signal, and additional gates responsive to said first series of control signals and to a signal from said pair of flip-flops to develop said second series of control signals.

6. In a system as defined in claim 1, said second coupling means comprising a common amplifier for amplifying outputs of said probe means.

7. In a system as defined in claim 6, said second coupling means further comprising a common threshhold circuit operative for passing only output signals of greater than a predetermined magnitude.

8. In a system as defined in claim 1, a second plurality of probe means supported in closely spaced relation for disposition against closely spaced portions of the part in a region spaced a substantial distance from the portions engaged by the first plurality of probe means, said second plurality of probe means being coupled to said energizing voltage source through said first coupling means and being coupled to said output circuit through said second coupling means.

9. In a system as defined in claim 8, said first and second pluralities of probe means being disposable against different quarter portions of a billet.

* * * * *